(12) United States Patent
Villmann et al.

(10) Patent No.: US 7,991,223 B2
(45) Date of Patent: Aug. 2, 2011

(54) METHOD FOR TRAINING OF SUPERVISED PROTOTYPE NEURAL GAS NETWORKS AND THEIR USE IN MASS SPECTROMETRY

(75) Inventors: Thomas Villmann, Leipzig (DE);
Frank-Michael Schleif, Leipzig (DE);
Barbara Hammer, Clausthal-Zellerfeld (DE)

(73) Assignee: Bruker Daltonik GmbH, Bremen (DE)

( * ) Notice: Subject to any disclaimer, the term of this patent is extended or adjusted under 35 U.S.C. 154(b) by 1005 days.

(21) Appl. No.: 11/848,353

(22) Filed: Aug. 31, 2007

(65) Prior Publication Data
US 2008/0095428 A1   Apr. 24, 2008

Related U.S. Application Data

(60) Provisional application No. 60/842,226, filed on Sep. 5, 2006.

(51) Int. Cl.
G06K 9/62 (2006.01)
G06N 3/02 (2006.01)
(52) U.S. Cl. .......................................... 382/156; 706/15
(58) Field of Classification Search ................... 382/156; 706/15
See application file for complete search history.

(56) References Cited

PUBLICATIONS

Martinetz, Thomas; "Neural-Gas" Network for Vector Quantization and its Application to Time-Series Prediction; IEEE Transactions on Neural Networks, vol. 4, No. 4, pp. 558-569, Jul. 1993.
Villman, et al.; "Fuzzy Labeled Neural Gas for Fuzzy Classification"; Proceedings of WSOM 2005, Paris, France, pp. 283-290, Sep. 5-8, 2005.
Villman, et al.; "Supervised Neural Gas and Relevance Learning in Learning Vector Quantization" 4th Workshop on Self-Organizing Maps, Kitakyushu (Japan) 2003, pp. 47-52.
Villmann, et al.; "Supervised Neural Gas for Learning Vector Quantization"; 5th German Workshop on Artificial Life, IOS Press, pp. 9-18, 2002.
Villman, et al.; "Fuzzy Classification by Fuzzy Labeled Neural Gas"; Proceedings of WSOM 2005, Paris, France.
Schleif, et al.; "Analysis and Visualization of Proteomic Data by Fuzzy Labeled Self-Organizing Maps"; 19th IEEE Symposium on Computer-Based Medical Systems (CBMS'06) pp. 919-924.

*Primary Examiner* — Bhavesh M Mehta
*Assistant Examiner* — Utpal Shah
(74) *Attorney, Agent, or Firm* — Law Offices of Paul E. Kudirka

(57) ABSTRACT

A Neural Gas network used for pattern recognition, sequence and image processing is extended to a supervised classifier with labeled prototypes by extending a cost function of the Neural Gas network with additive terms, each of which increases with a difference between elements of the class labels of a prototype and a training data point and decreases with their distance. The extended cost function is then iteratively minimized by adapting weight vectors of the prototypes. The trained network can then be used to classify mass spectrometric data, especially mass spectrometric data derived from biological samples.

22 Claims, 3 Drawing Sheets

METHOD FOR TRAINING OF SUPERVISED PROTOTYPE NEURAL GAS NETWORKS AND THEIR USE IN MASS SPECTROMETRY

BACKGROUND

The invention relates to prototype-based algorithms used for pattern recognition, sequence and image processing. Clustering techniques are primarily aimed at partitioning a set of data points into subsets in order to estimate their density distribution, respectively. Clustering is an unsupervised technique, that is, it does not take into account labels of the data points. However, it is an important task with high relevance for a plurality of applications, such as pattern recognition, sequence processing and image processing. Conventional tools for clustering often use known prototype-based algorithms, such the Self-Organizing Map, k-means clustering and the Neural Gas network algorithms.

Neural algorithms, such as a Neural Gas algorithm, are modeled as a set of neurons, each of which responds to a particular stimulus pattern called a "prototype." A Neural Gas network maps data points from a (normally) high-dimensional data space D onto a set of N prototypes. The data space D is typically a subset of real-valued d-tuples ($D \subset R^d$). Each prototype is associated with a weight vector $w_i \in D$ (i=1 ... N). In order to use such a network for clustering, the network must first be "trained." During the training of the Neural Gas network, a sequence of training data points $v_j \in D$ (j=1 ... M) is presented to the set of prototypes with respect to the data density distribution. Each one of these training data points is then mapped onto the prototype that is "closest" in distance to the presented training data point. The distance between a training data point v and a prototype $w_i$ is usually determined by applying the Euclidian norm to the weight vector and data vector: $d(v,w_i) = \|v - w_i\|$. The weight vectors of the closest prototype and prototypes in its neighborhood are then "adapted" or shifted towards the data vector of the presented training data point as follows:

$$\Delta w_i = \epsilon \cdot h(v, w_i) \cdot (v - w_i),$$

wherein $\epsilon$ is a parameter for the learning rate, $w_i$ is the weight vector of the prototype with index i, v is the data vector of the presented training data point and $h(v,w_i)$ is a neighborhood function. The neighborhood function of the Neural Gas network is usually defined as:

$$h(v, w_i) = \exp\left(-\frac{k(v, w_i)}{\sigma}\right),$$

wherein $\sigma$ is a scaling parameter for the size of the neighborhood and $k(v,w_i)$ is the so called rank function which yields the number of prototypes that are closer to the presented training data point than the prototype with index i. The adapting rule for the weight vectors follows, in average, a dynamic according to a potential function $E_{NG}$. An illustrative potential function is:

$$E_{NG} \propto \sum_{vj} \sum_{wi} h(v_j, w_i) \cdot d(v_j, w_i),$$

wherein $h(v_j, w_i)$ is the neighborhood function of the Neural Gas network and $d(v_j, w_i)$ is the distance measure between the prototype with index i and the training data point with index j. Each weight vector $w_i$ is adapted along that direction where the cost function $E_{NG}$ decreases most strongly. Neural networks and potential functions are described in more detail in Martinez et al.: "Neural-gas network for vector quantization and its application to time-series prediction", in *IEEE Transactions on Neural Networks*, v. 4, iss. 4, pp 558-569, 1993, which article is incorporated herein by reference in its entirety.

In addition to conventional algorithms for clustering of unlabeled data, there are also known prototype-based classification algorithms that work on labeled data in a supervised scheme. In accordance with these latter algorithms, labeled prototypes are distributed in the data space and trained to detect and represent different data classes. A trained algorithm (also called a "constructed classifier") can be used to assign unlabeled data points to one of the different data classes. Important approaches along these lines are the Learning Vector Quantization (LVQ) and recent developments like the Generalized LVQ (GLVQ) or the Supervised Neural Gas network (SNG) by Villmann et al. ("Supervised neural gas for learning vector quantization", in: *5th German Workshop on Artificial Life*, IOS Press, pp 9-18, 2002).

The SNG transforms the unsupervised Neural Gas network into a supervised classifier. Here, the prototypes and data points for training the prototypes are labeled, i.e. each of them is associated with one class label ($c_v$=label of data point, $c_{wi}$=label of prototype with index i). The cost function of the SNG is modified as follows:

$$E_{SNG} \propto \sum_{vj} \sum_{wi} h^*(v_j, w_i) \cdot sgd\left(\frac{d(v_j, w_i) - d^-}{d(v_j, w_i) + d^-}\right),$$

wherein h* is a modified neighborhood function, sgd(x) denotes the well known logistic function, $d(w_i,v_j)$ is the distance measure between the prototype with index i and the training data point with index j, and $d^-$ denotes the distance of the closest mislabeled prototype to the training data point with index j. The term of the logistic function stems from the GLVQ. The modified neighborhood function h is defined as:

$$h^*(v, w_i) = \begin{cases} \exp\left(-\frac{k(v, w_i)}{\sigma}\right) & c_v = c_{wi} \\ 0 & c_v \neq c_{wi}, \end{cases}$$

wherein $\sigma$ is a scaling parameter for the size of the neighborhood and $k(w_i,v)$ is the rank function. Only the closest misclassified prototype and prototypes that have the same class label as the presented training data point contribute to the cost function. The minimization of the cost function $E_{SNG}$ results in shifting all prototypes having the same label as the presented training data point toward the training data point and in shifting the closest misclassified prototype away from the presented training data point.

A further development is the Supervised Relevance Neural Gas network (SRNG) by Villmann et al. ("Supervised Neural Gas and Relevance Learning in Learning Vector Quantization", in: *4th Workshop on Self-Organizing Maps*, Kitakyushu (Japan) 2003, pp. 47-52). Here, the distance measure between training data points and prototypes is extended by introducing relevance parameters that weight each dimension of the data space differently.

One major assumption of most conventional classification approaches is that the assignments to classes have to be "crisp", that is, training data points and prototypes must be uniquely assigned to one of the classes. It is possible to relax the crisp assignment requirement for the prototypes by a subsequent post-labeling of the prototypes after unsupervised training according to their responsibility to the training data points, thereby yielding fuzzy assignments. However, at present, there are no supervised prototype-based approaches to work with fuzzy labels during training, although such approaches would be desirable. In real world applications, especially for classification of biological data, a clear (crisp) classification of training data points may be difficult or impossible. For example, assignments of a patient to a certain disorder (disease) can generally be done only in a probabilistic (fuzzy) manner. Hence, it is of great interest to have classifiers, which are able to manage this type of data.

Here, the term "biological data" or "biological data points" means any data derived from measuring biological conditions of human, animals or other biological organisms including microorganisms, viruses, plants and other living organisms. Biological data may include, but is not limited to, clinical tests and observations, physical and chemical measurements, genomic determinations, proteomic determinations, drug levels, hormonal and immunological tests, neurochemical or neurophysical measurements, mineral and vitamin level determinations, genetic and familial histories, and other determinations that may give insight into the state of the individual or individuals that are undergoing testing.

In the last decade especially, mass spectrometry is increasingly used to investigate biological systems and to generate biological data as defined above. In general, mass spectrometric data can be considered as high-dimensional data because every signal in a mass spectrum related to a particular mass may be considered as a single dimension. Even if a mass spectrum is preprocessed into a list of peaks by selecting only those signals above a threshold, as it is well known in the art, mass spectrometric data may still be high-dimensional and therefore, it would be highly appropriate to analyze this data by prototype-based algorithms.

SUMMARY

In accordance with the principles of the invention, the conventional Neural Gas network is extended to allow the use of fuzzy class labels. The extended network is called a Fuzzy Labeled Neural Gas (FLNG) network. In particular, class labels are incorporated in the FLNG network by numerical differences and not by crisp assignments that depend on inclusion in a neighborhood or not. Alternatively, depending on the application, the class labels of the class label vectors can be crisply assigned and there may be a second set of prototypes that are not labeled at all.

In accordance with the invention, a Neural Gas network can be trained on mass spectrometric data by providing a set of training data points, each including a data vector and a class label vector and initializing a set of prototypes, each including a weight vector and a class label vector. In addition, the cost function of the conventional Neural Gas network is extended by additive terms, wherein each of the additive terms increases with an increase in the difference between elements of the class label vectors of a prototype and a training data point and decreases with an increase in the distance between the data vector of the training data point and the weight vector of the prototype. The phrase "additive terms" is not restricted to discrete terms, but such terms can also comprise integrals (as an infinite number of infinitesimal terms) in the case of a continuous data or an approximation thereof. The number of elements in the class label vectors corresponds to the number of different classes. Next, the weight vectors of the prototypes are iteratively adapted such that the extended cost function is minimized.

As result of the additive terms, which preferably all are positively valued, the cost function is most strongly influenced by misclassified prototypes near training data points. A minimization of the cost function with regard to the weight vectors of the prototypes is most effective by shifting these misclassified prototypes away from the training data points and shifting prototypes having the same class label towards the nearest training data point.

In a first embodiment of the invention, additive terms can be the squared differences of class label vector elements between prototypes and training data points, wherein each squared difference is weighted by a neighborhood function, for example, the known neighborhood function of the Neural Gas network or a Gaussian kernel.

In another embodiment, the class label vectors of the prototypes and/or relevance parameters are iteratively adapted together with the weight vectors of the prototypes such that the extended cost function $E_{FLNG}$ is further minimized.

After being trained according to the present invention, the FLNG network can be used to classify unlabeled mass spectrometric data (such as biological data generated by mass spectrometry) by comparing the mass spectrometric data vectors with iterated weight vectors of the prototypes. The number and size of different classes can be estimated by analyzing iterated class label vectors, for example, the number of prototypes associated with a class after training can be a measure for the size of the class. Furthermore, a risk estimation of the classification can be made by analyzing the distribution of the class labels with regard to the position of the trained prototypes in the data space. The relevance of different dimensions can also be estimated by comparing adapted relevance parameters before and after the training.

DETAILED DESCRIPTION

While the invention has been shown and described with reference to a number of embodiments thereof, it will be recognized by those skilled in the art that various changes in form and detail may be made herein without departing from the spirit and scope of the invention as defined by the appended claims.

A prototype of a Neural Gas network is assigned with a weight vector $w_i$ of a high dimensional data space D that is typically a subset of real valued d-tuple ($D \subset R^d$). All weight vectors establish a set of prototypes $W=\{w_i, \overline{i}=1 \ldots N\}$. In an FLNG network, each one of the prototypes is further assigned a class label vector $c_{wi} \in [0,1]^{NC}$, wherein NC is the number of classes.

To include the fuzzy class labels of the class label vectors $c_{wi}$ into an extended cost function of the FLNG network, a term $E_{FL}$ is added to the cost function $E_{NG}$ of a conventional Neural Gas network:

$$E_{FLNG} = (1-\beta) \cdot E_{NG} + \beta \cdot E_{FL}$$

The balance parameter $\beta$ is preferably between 0.4 and 0.7, but can also be adjusted during the iteration of the weight vectors or during subsequent trainings.

Figure 1:
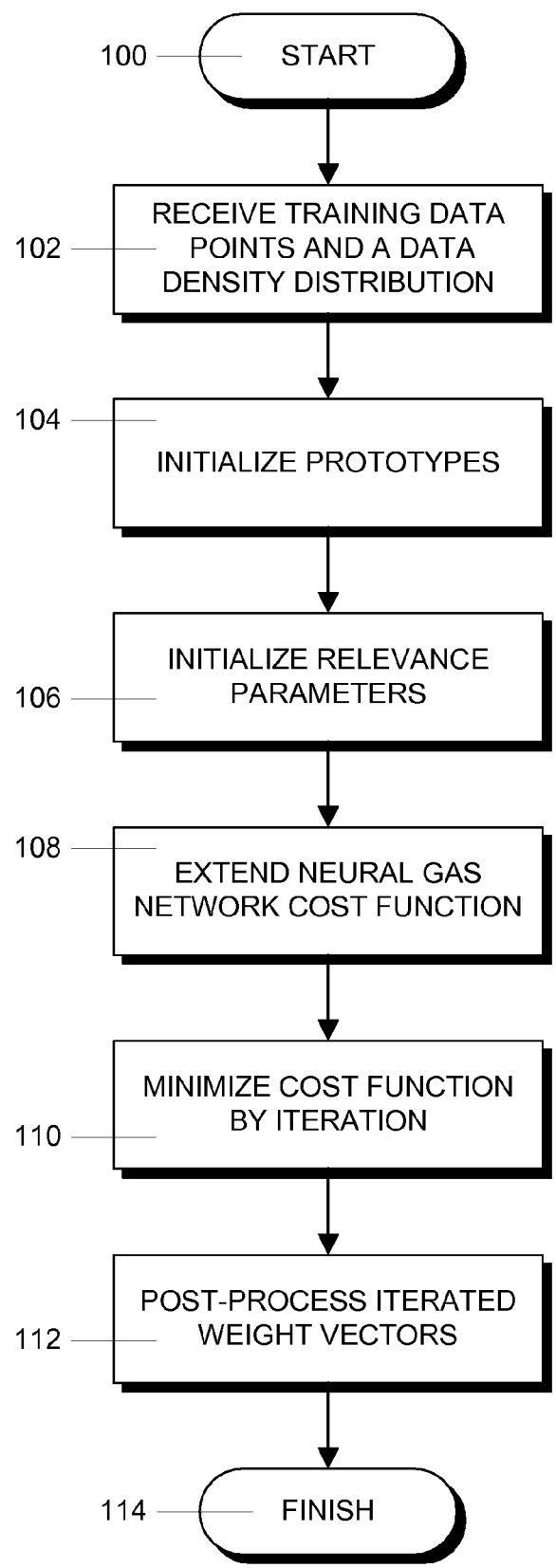
FIG. 1 shows the flow chart for training a FLNG network in accordance with the principles of the invention.

FIG. 1 is a flowchart that shows the steps in an illustrative process for the training of an FLNG network on mass spectrometric data. This process begins in step 100 and proceeds to step 102 where training data points, for example, mass spectra or peak lists generated from mass spectra, are received together with an estimated data density distribution P(v) from a data source, such as a computer memory in which the data values and density distribution are stored. Each training data point comprises a data vector v and a class label vector c(v). The data vector can be a mass spectrum, such as a mass spectrum acquired from biological data.

The training data points may be pre-processed in different ways known from state of the art before being provided to the FLNG network. In step 104, weight vectors and label vectors of prototypes are initialized in the data space and in the class label space $([0,1]^{NC})$ respectively. In some embodiments, the distance measure used in the neighborhood function of the FLNG network can be extended by relevance parameters $\lambda_k$:

$$d_\lambda(v, w_i) = \sum_k \lambda_k \cdot (v^k - w_i^k)^2,$$

wherein k=1 ... d, $w_i^k$ and $v_k$ are elements of the weight vector and the respective data vector of the training data point. If the extended distance measure is used, the relevance parameters are initialized in step 106.

In step 108, the cost function for the FLNG network is derived by extending the cost function $E_{NG}$ of a conventional neural gas network by the additive term $E_{FL}$ by using the balance factor $\beta$ as described above. The additive term $E_{FL}$ is defined as a sum of integrals as follows:

$$E_{FL} = \sum_{wi} \int P(v) \cdot \bar{h}(v, w_i, W) \cdot (c(v) - c_{wi})^2 dv$$

Each differential term $P(v) \cdot (c(v) - c_{wi})^2 dv$ between the class label vectors of a prototype and a training data point is weighted by a neighborhood function $\bar{h}(v, w_i, W)$ that decreases with distance between the prototype and the training data vector. Here, $(c(v) - c_{wi})^2$ is defined as a sum of additive terms:

$$\sum_k (c(v)^k - c_{wi}^k)^2 \text{ with } k = 1 \dots NC.$$

The neighborhood function $\bar{h}(v, w_i, W)$ may not only depend on the weight vector of one prototype with index i and the data vector of one training data point, but can also depend on the position of all other prototypes compared to the prototype with index i. Therefore, the whole set of prototypes W is a parameter of the neighborhood function. In one embodiment, the neighborhood function is defined by a Gaussian kernel:

$$\bar{h}(v, w_i, W) = \exp\left(-\frac{d_\lambda(v, w_i)}{\sigma^2}\right),$$

wherein $\sigma$ is a scaling parameter for the size of the neighborhood and $d_\lambda(v,w_i)$ is the extended Euclidian distance measure. The normal Euclidian distance measure $d(v, w_i)$ may also be used in this neighborhood function.

In another embodiment, the neighborhood function is defined as an approximation of the original neighborhood function of the conventional Neural Gas network using a sigmoid function $\xi$:

$$\bar{h}(v, w_i, W) = \exp\left(-\frac{\bar{k}(v, w_i)}{\sigma}\right)$$

wherein $\sigma$ is a scaling parameter for the size of the neighborhood and $\bar{k}$ is an extended rank function:

$$\bar{k}(v, w_i) = \sum_l \zeta(d_\lambda(v, w_i) - d_\lambda(v, w_l)),$$

with sigmoid function $\xi(x) = \frac{1}{1 + \exp(-x/\tau)}$ here also the extended Euclidian distance measure is used, although the normal Euclidian distance measure may also be used. In addition, in other embodiments, the neighborhood function may use known distance measurements other than the Euclidian norm or the extended Euclidian norm.

In step 110, the extended cost function of the FLNG network $E_{FLNG}$ is minimized by adapting the weight vectors $w_i$. In one embodiment, the weight vectors are adapted by iterating the weight vectors, for example, using a conventional descent gradient algorithm. Here, the weight vectors are updated along the gradient $\partial E_{FLNG}/\partial w_i$. Optionally, the label vectors $c_{wi}$ and relevance parameters $\lambda_k$ may also be adapted or updated in the same way along their gradients ($\partial E_{FLNG}/\partial c_{wi}$, $\partial E_{FLNG}/\partial \lambda_k$) in order to minimize the extended cost function. By adapting class labels of prototypes, a misclassification during initialization is balanced faster as compared to simply shifting misclassified prototypes away from the wrong class. The iterated weight vectors, the optionally iterated class label vectors of the prototypes and the optionally iterated relevance parameters are analyzed and visualized in a post-processing step 112. The iterated prototypes may be further used to classify unlabeled data points. The process then finishes in step 114.

In still another embodiment, the training data can be discrete and the term $E_{FL}$ is defined as a sum of additive terms of all pairs of prototypes and training data points:

$$E_{FL} = \sum_{wi} \sum_{vj} \exp\left(-\frac{k(v_j, w_i)}{\sigma}\right) \cdot (c_{vj} - c_{wi})^2$$

wherein $\sigma$ is a scaling parameter for the size of the neighborhood, k is the original rank function, $v_j$ and $c_{vj}$ are respectively the data vectors and the class label vectors of the training data points, and $w_i$ and $c_{wi}$ are respectively the weight vectors and the class label vectors of the prototypes.

The following is an example illustrating the use of a network trained in accordance with the inventive process. This example involves a search for biomarker patterns by mass spectrometry. Searches of this type are a fast emerging technique used for medical diagnosis, predictive medicine and pharmacological monitoring. Of particular interest is the identification of tumor markers and their use for early diagnosis of cancer to improve the clinical prognosis of patients. However, many other disciplines take advantage of such a mass-spectrometry based technique in clinical studies, for example urology, psychiatry, neurology, toxicology and pharmacology. The searches for biomarkers are mainly conducted in complex body fluids like serum, plasma, urine, saliva, or cerebral spinal fluid. The mass spectrometric data derived from these body fluids are very often high-dimensional so that an efficient analysis and visualization of this high-dimensional data space is important to provide clinical experts with useful information (content) instead of data only.

Figure 2:
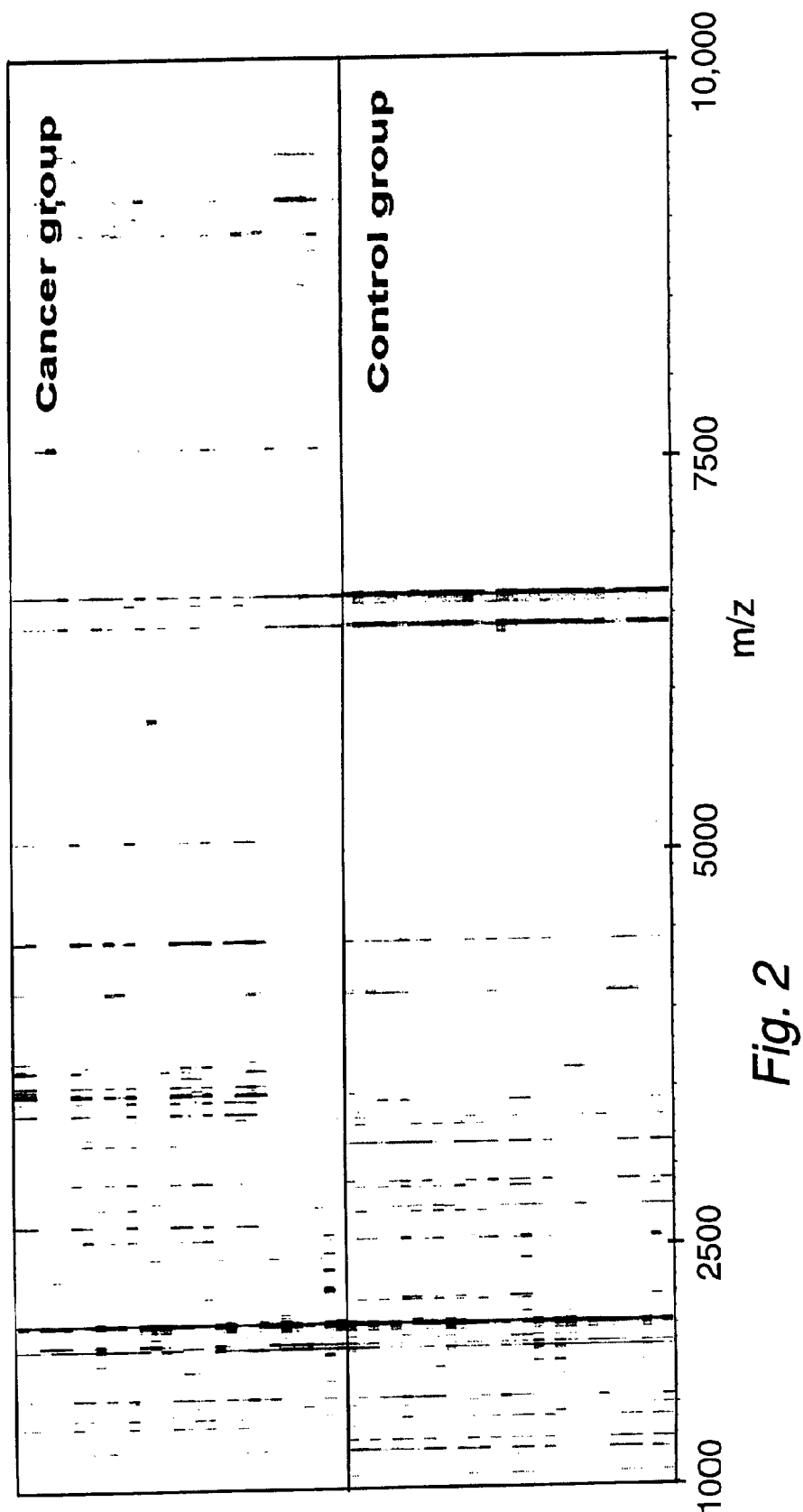
FIG. 2 shows two sets of measured mass spectra in the range of 1000 to 10000 Dalton. The first set of mass spectra is obtained from plasma samples of acute lymphatic leukemia (ALL) patients. The second set of mass spectra belongs to a control group. Each one of the 60 mass spectra represents one training data point in a high-dimensional data space.

In the present example 60 plasma samples from 30 acute lymphatic leukemia (ALL) patients and 30 controls are collected and treated with the coagulation inhibitor EDTA. The samples are prepared in a one-step procedure using commercially available hydrophobic micro beads (MB-HIC C8 Kit, Bruker Daltonik, Bremen, Germany). The components of the plasma samples being captured on the surface of the micro beads are eluted onto a MALDI (=Matrix Assisted Laser Desorption and Ionization) plate by using an alpha-cyano-4-hydroxy-cinnamic acid (HCCA). For each one of the 60 samples a mass spectrum is generated on an Autoflex® MALDI Time-of-Flight mass spectrometer (Bruker Daltonik, Bremen, Germany) in linear mode by summing up 300 single mass spectra per sample. The mass spectra of the samples are automatically preprocessed including background subtraction, normalization, internal signal alignment using prominent internal peaks of the mass spectra, and a peak picking procedure. Each of these pre-processed and labeled mass spectra is one training data point. An initial visualization of the whole set of the 60 preprocessed mass spectra is depicted in FIG. 2, which shows a density plot, also called a "gel-view" as known from gel electrophoresis. The mass to charge ratio varies along the x-axis from 1000 to 10000 Dalton. The y-axis denotes the identification number of the samples. The mass spectra of the ALL patients are plotted above the mass spectra of the control group. The density plot gives an overview representation of the training data points derived from large sample cohorts.

Figure 3:
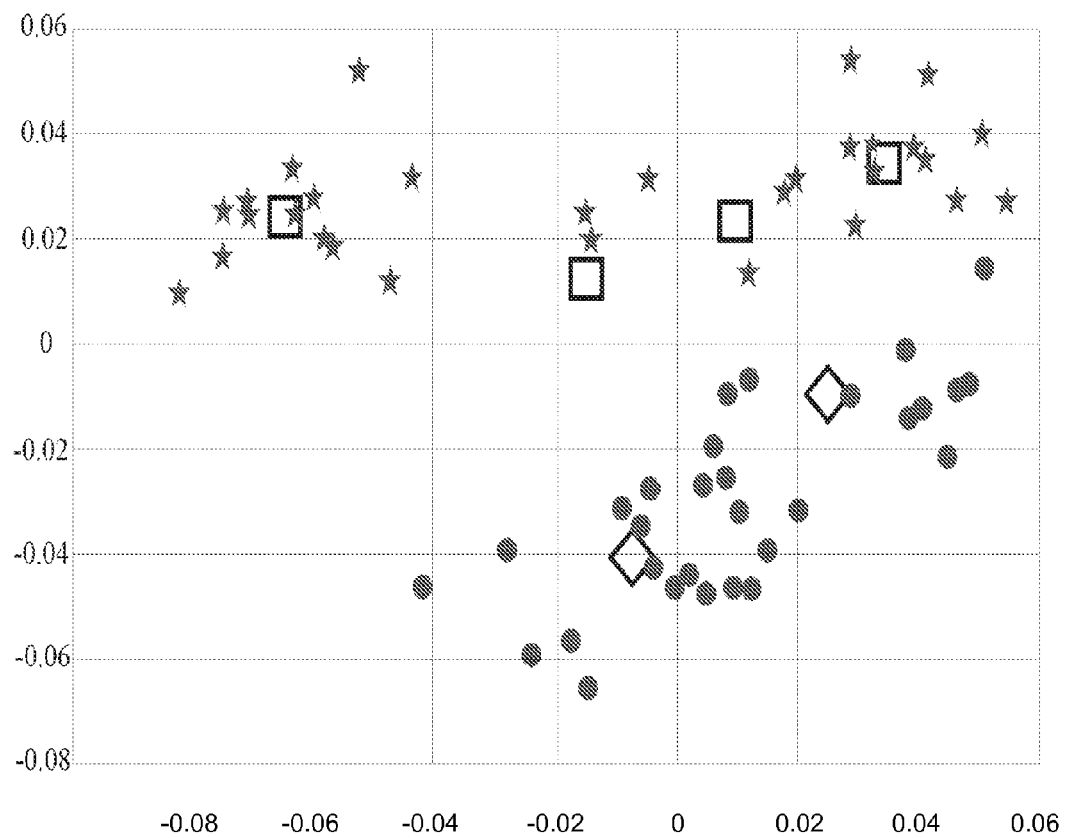
FIG. 3 shows the training data points of FIG. 2 together with six prototypes of an FLNG network after training in accordance with the process shown in FIG. 1. The training data points and the iterated prototypes are projected in the space of a Principal Component Analysis using the first two principal components.

After pre-processing, the training data points are analyzed with an FLNG network trained with the process shown in FIG. 1. In the presented example, a neighborhood function with the approximated rank function is used and the balance parameter β is set to 0.75. The prototypes are randomly initialized. The result of the training is shown in FIG. 3. Here, the training data and the trained prototypes are projected in the space of a Principal Component Analysis using the first two principal components, so that each one of the 60 mass spectra is represented by only one symbol. Data of the control class are given by "★" and control prototypes by "□". Cancer data are given by "●" and corresponding prototypes by "◇". The projection is done for visualizing the outcome of the training of the FLNG network. The trained prototypes "□" and "◇" are well positioned into their corresponding classes. The classification accuracy obtained with the training data is about 95%. By an analysis of the trained relevance parameters, a ranking of features is found. The ranking allows the identification of most relevant dimensions, i.e. peaks the mass spectra. The relevant peaks can be used for identifying biomarker candidates, for example by an in-depth analysis using the capabilities of tandem mass spectrometry analysis and in combination with a database search.

What is claimed is:

1. A method for training a Neural Gas network having a cost function on mass spectrometric data, comprising:
    (a) initializing a set of prototypes, each prototype including a weight vector and a class label vector;
    (b) receiving a set of training mass spectrometric data points, each training data point including a data vector and a class label vector;
    (c) extending the cost function of the Neural Gas network by additive terms, wherein each of the terms increases with an increase in a difference between elements of class label vectors of a prototype and a training data point and decreases with an increase in the distance between the data vector of the training data point and the weight vector of the prototype; and
    (d) iteratively adapting the weight vectors of the prototypes such that the extended cost function is minimized.

2. The method of claim 1, wherein class labels of the class label vectors are fuzzy.

3. The method of claim 1, wherein class labels of the class label vectors are crisp.

4. The method of claim 1, wherein step (c) comprises extending the cost function by a sum of integrals denoted as $$\sum_{wi} \int P(v) \cdot \exp\left(-\frac{d(v, w_i)}{\sigma^2}\right) \cdot (c_v - c_{wi})^2 dv,$$

wherein $w_i$ and $c_{wi}$ are respectively, the weight vectors and the class label vectors of the prototypes, v and c(v) are respectively the data vectors and the class label vectors of the training data points, $d(v, w_i)$ is a distance measure between the prototypes and the training data points and P(v) is a density distribution of the training data points.

5. The method of claim 1, wherein step (c) comprises extending the cost function by an sum of integrals $$\sum_{wi} \int P(v) \cdot \exp\left(-\frac{\sum_{wi} \zeta(d(v, w_i) - d(v, w_i))}{\sigma}\right) \cdot (c_v - c_{wi})^2 dv,$$

wherein ξ is the sigmoid function, $w_i$ and $c_{wi}$ are respectively the weight vectors and the class label vectors of the prototypes, v and c(v) are respectively the data vectors and the class label vectors of the training data points, $d(w_i, v)$ is a distance measure between the prototypes and the training data points and P(v) is a density distribution of training data points.

6. The method of claim 1, wherein step (c) comprises extending the cost function by a sum over the additive terms $$\sum_{vj} \sum_{wi} h(v_j, w_i) \cdot (c_{wi} - c_{vj})^2,$$

wherein $w_i$ and $c_{wi}$ are respectively the weight vectors and the class label vectors of the prototypes, $v_j$ and $c_{vj}$ are respectively the data vectors and the class label vectors of the training data points and $h(v_j, w_i)$ is a neighborhood function between the prototypes and the training data points.

7. The method of claim 1, further comprising iteratively adapting the class label vectors of the prototypes such that the extended cost function is minimized.

8. The method of claim 1, wherein a distance measure is applied in the extended cost function and wherein the distance measure depends on a plurality of relevance parameters, such that there is a relevance parameter for each data space dimension.

9. The method of claim 8, further comprising iteratively adapting each of the plurality of relevance parameters such that the extended cost function is minimized.

10. The method of claim 1, further comprising initializing and iteratively adapting a second set of unlabeled prototypes.

11. A method for classifying unlabeled biological data generated by mass spectrometry or unlabeled mass spectrometric data, comprising:
(a) training a Neural Gas network having a cost function on mass spectrometric data by,
    (i) initializing a set of prototypes, each prototype including a weight vector and a class label vector,
    (ii) receiving a set of training mass spectrometric data points, each training data point including a data vector and a class label vector,
    (iii) extending the cost function of the Neural Gas network by additive terms, wherein each of the terms increases with an increase in a difference between elements of class label vectors of a prototype and a training data point and decreases with an increase in the distance between the data vector of the training data point and the weight vector of the prototype, and
    (iv) iteratively adapting the weight vectors of the prototypes such that the extended cost function is minimized; and
(b) comparing a distance of weight vectors of the prototypes adapted in step
    (a)(iv) with data vectors of the unlabeled data.

12. The method of claim 11, wherein class labels of the class label vectors are fuzzy.

13. The method of claim 11, wherein class labels of the class label vectors are crisp.

14. The method of claim 11, wherein step (a)(iii) comprises extending the cost function by a sum of integrals denoted as $$\sum_{wi} \int P(v) \cdot \exp\left(-\frac{d(v, w_i)}{\sigma^2}\right) \cdot (c_v - c_{wi})^2 dv,$$

wherein $w_i$ and $c_{wi}$ are respectively, the weight vectors and the class label vectors of the prototypes, v and c(v) are respectively the data vectors and the class label vectors of the training data points, $d(v, w_i)$ is a distance measure between the prototypes and the training data points and P(v) is a density distribution of the training data points.

15. The method of claim 11, wherein step (a)(iii) comprises extending the cost function by an sum of integrals $$\sum_{wi} \int P(v) \cdot \exp\left(-\frac{\sum_{wl} \zeta(d(v, w_i) - d(v, w_l))}{\sigma}\right) \cdot (c_v - c_{wi})^2 dv,$$

wherein $\xi$ is the sigmoid function, $w_i$ and $c_{wi}$ are respectively the weight vectors and the class label vectors of the prototypes, v and c(v) are respectively the data vectors and the class label vectors of the training data points, $d(w_i,v)$ is a distance measure between the prototypes and the training data points and P(v) is a density distribution of training data points.

16. The method of claim 11, wherein step (a)(iii) comprises extending the cost function by a sum over the additive terms $$\sum_{vj} \sum_{wi} h(v_j, w_i) \cdot (c_{wi} - c_{vj})^2,$$

wherein $w_i$ and $c_{wi}$ are respectively the weight vectors and the class label vectors of the prototypes, $v_j$ and $c_{vj}$ are respectively the data vectors and the class label vectors of the training data points and $h(v_j, w_i)$ is a neighborhood function between the prototypes and the training data points.

17. The method of claim 11, wherein step (a) further comprises iteratively adapting the class label vectors of the prototypes such that the extended cost function is minimized.

18. The method of claim 11, wherein a distance measure is applied in the extended cost function and wherein the distance measure depends on a plurality of relevance parameters, such that there is a relevance parameter for each data space dimension.

19. The method of claim 18, wherein step (a) further comprises iteratively adapting each of the plurality of relevance parameters such that the extended cost function is minimized.

20. The method of claim 11, wherein step (a) further comprises initializing and iteratively adapting a second set of unlabeled prototypes.

21. A method for estimating the number and size of different classes of biological data generated by mass spectrometry or mass spectrometric data comprising:
(a) training a Neural Gas network having a cost function on mass spectrometric data, by
    (i) initializing a set of prototypes, each prototype including a weight vector and a class label vector,
    (ii) receiving a set of training mass spectrometric data points, each training data point including a data vector and a class label vector,
    (iii) extending the cost function of the Neural Gas network by additive terms, wherein each of the terms increases with an increase in a difference between elements of class label vectors of a prototype and a training data point and decreases with an increase in the distance between the data vector of the training data point and the weight vector of the prototype,
    (iv) iteratively adapting the weight vectors of the prototypes such that the extended cost function is minimized, and
    (v) iteratively adapting the class label vectors of the prototypes such that the extended cost function is minimized; and
(b) comparing the class label vectors of the prototypes adapted in step (a)(v) before and after the training in step (a).

22. A method for estimating the relevance of data dimensions of biological data generated by mass spectrometry or mass spectrometric data comprising:
(a) training a Neural Gas network on mass spectrometric data, the Neural Gas network having a cost function and a distance measure that depends on a plurality of relevance parameters wherein there is a relevance parameter for each data space dimension, by
    (i) initializing a set of prototypes, each prototype including a weight vector and a class label vector, (ii) receiving a set of training mass spectrometric data points, each training data point including a data vector and a class label vector, (iii) extending the cost function of the Neural Gas network by additive terms, wherein each of the terms increases with an increase in a difference between elements of class label vectors of a prototype and a training data point and decreases with an increase in the distance between the data vector of the training data point and the weight vector of the prototype, (iv) iteratively adapting the weight vectors of the prototypes such that the extended cost function is minimized, and (v) iteratively adapting each of the plurality of relevance parameters such that the extended cost function is minimized; and (b) comparing the relevance parameters adapted in step (a)(v) before and after the training in step (a).

* * * * *